(12) United States Patent
McCarter

(10) Patent No.: US 10,604,054 B1
(45) Date of Patent: Mar. 31, 2020

(54) PORTABLE CONDIMENT HOLDER SYSTEM AND DEVICE FOR USE IN A VEHICLE

(71) Applicant: Zevon McCarter, Temple Terrace, FL (US)

(72) Inventor: Zevon McCarter, Temple Terrace, FL (US)

( * ) Notice: Subject to any disclaimer, the term of this patent is extended or adjusted under 35 U.S.C. 154(b) by 0 days.

(21) Appl. No.: 16/232,457

(22) Filed: Dec. 26, 2018

(51) Int. Cl.
   *B60N 3/10* (2006.01)
   *F16M 13/02* (2006.01)
   *A47G 19/18* (2006.01)

(52) U.S. Cl.
   CPC ............ *B60N 3/103* (2013.01); *A47G 19/18* (2013.01); *F16M 13/02* (2013.01)

(58) Field of Classification Search
   CPC ........ B60N 3/00–103; F16M 13/00–02; A47G 19/00–18
   See application file for complete search history.

(56) References Cited

U.S. PATENT DOCUMENTS

| | | |
|---|---|---|
| 5,106,046 A | 4/1992 | Rowles et al. |
| 5,842,631 A | 12/1998 | Berger |
| 5,865,412 A * | 2/1999 | Mason .................. A47C 7/62 248/214 |
| 6,360,944 B1 | 3/2002 | Gorman |
| 6,364,112 B1 | 4/2002 | Pitschka |
| 7,520,417 B2 | 4/2009 | Biedermann et al. |
| 8,443,996 B2 | 5/2013 | Ciarrocchi |
| 2001/0050283 A1 | 12/2001 | Nance |
| 2003/0024842 A1 | 2/2003 | Blink |
| 2003/0141355 A1 | 7/2003 | McLean |
| 2004/0031796 A1 | 2/2004 | Krueger et al. |
| 2004/0094587 A1 | 5/2004 | Harden et al. |
| 2005/0161471 A1 | 7/2005 | Grenda |
| 2008/0290089 A1 | 11/2008 | Ciarrocchi |
| 2011/0000908 A1 | 1/2011 | Bertin |
| 2011/0000925 A1 * | 1/2011 | Okamoto ............... B60N 3/103 220/738 |
| 2013/0200124 A1 | 8/2013 | Burwinkel et al. |
| 2015/0021219 A1 * | 1/2015 | Seyfferth De Oliveira ................ B65D 85/1045 206/268 |
| 2015/0217697 A1 | 8/2015 | Peters |

OTHER PUBLICATIONS

Milkmen Design,LLC; Saucemoto; dip clip; Website; Retrieved Jun. 24, 2019; Retrieved from Internet, https://www.saucemoto.com/collections/homepage/products/saucemoto®-dip-clip-new; Apr. 7, 2018; 6 pages; US.

* cited by examiner

*Primary Examiner* — Kareen K Thomas
(74) *Attorney, Agent, or Firm* — Olav M. Underdal; IDP Patent Services

(57) ABSTRACT

A portable condiment holder system, includes a portable condiment holder device with a container holder, a length-adjustable holder arm with a downward bent outer end, and optionally a lid; and a condiment container with a condiment, such that the outer part of the holder arm can be attached to a gap between an inner door casing and a windowpane of a door of a vehicle, such that the condiment container is stably positioned with convenient access to the condiment. Optionally, an accessory can be attached to the container holder.

19 Claims, 8 Drawing Sheets

Portable Condiment Holder System

Portable Container Holder Device

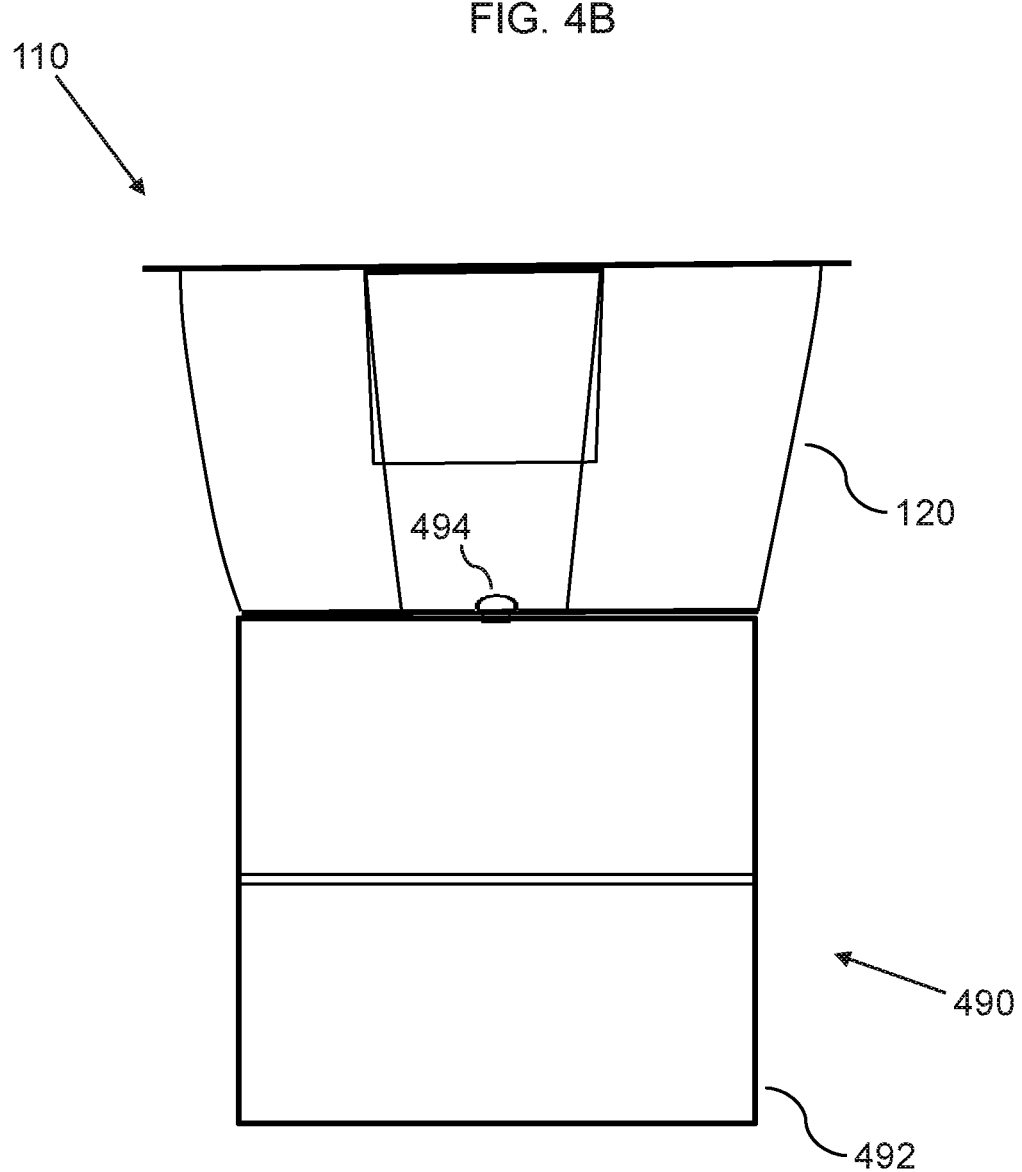

PORTABLE CONDIMENT HOLDER SYSTEM AND DEVICE FOR USE IN A VEHICLE

CROSS-REFERENCE TO RELATED APPLICATIONS

N/A.

FIELD OF THE INVENTION

The present invention relates generally to the field of condiment container systems for personal use, and more particularly to methods and systems for holding a condiment container in vehicle.

BACKGROUND OF THE INVENTION

Consumers will frequently use drive-in facilities at fast food vendors to procure fast food items that often come with condiments typically packed in small square or round containers.

While some cup holder systems are available, there are typically no good options for holding condiment containers. Therefore, when consuming the purchased food it can be difficult to avoid spillage in the vehicle.

As such, considering the foregoing, it may be appreciated that there continues to be a need for novel and improved devices and methods for holding a condiment container in vehicle.

SUMMARY OF THE INVENTION

The foregoing needs are met, to a great extent, by the present invention, wherein in aspects of this invention, enhancements are provided to the existing model of condiment holders.

In an aspect, a portable condiment holder system for use in a vehicle can include:
 a) a portable condiment holder device, including:
  a container holder, which can be a basket; and
  a holder arm, with an outer part and an inner part,
   wherein the outer part is connected to the inner part, such that the outer part bends downward;
   such that the holder arm is connected to the container holder and extends to an outer side of the container holder; and
 b) a condiment container with a condiment therein;
 such that the container holder matches an external shape of the condiment container, such that the condiment container fits into the container holder;
 such that the outer part of the holder arm is insertable in a gap between an inner door casing and a windowpane of a door of a vehicle;
 such that the inner part of the holder arm is positioned over the inner door casing and in front of the windowpane;
 whereby the portable condiment holder device can be attached to an inner side of the door, such that the condiment container can be removably positioned in the container holder;
 whereby the condiment container is stably and safely positioned with convenient access to the condiment for consumption by a driver or passenger in the vehicle.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4B is a front view of a portable condiment holder device with a connected accessory, according to an embodiment of the invention.

DETAILED DESCRIPTION

Figure 1A:
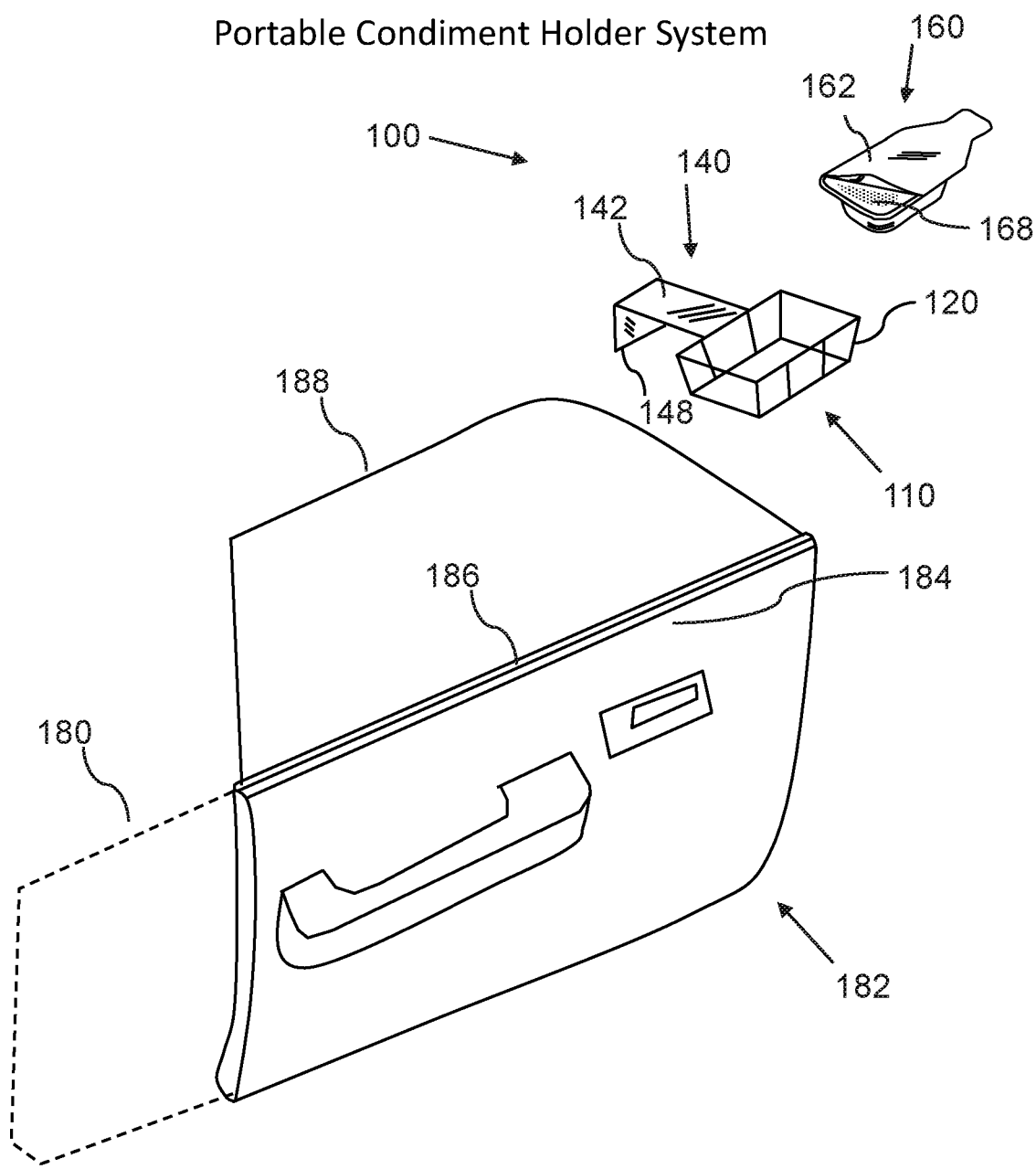
FIG. 1A is an exploded perspective view of a portable condiment holder system, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a portable condiment holder system 100 with reference to FIGS. 1A and 1B, in such manner that like reference numerals refer to like components throughout; a convention that we shall employ for the remainder of this specification.

Figure 1B:
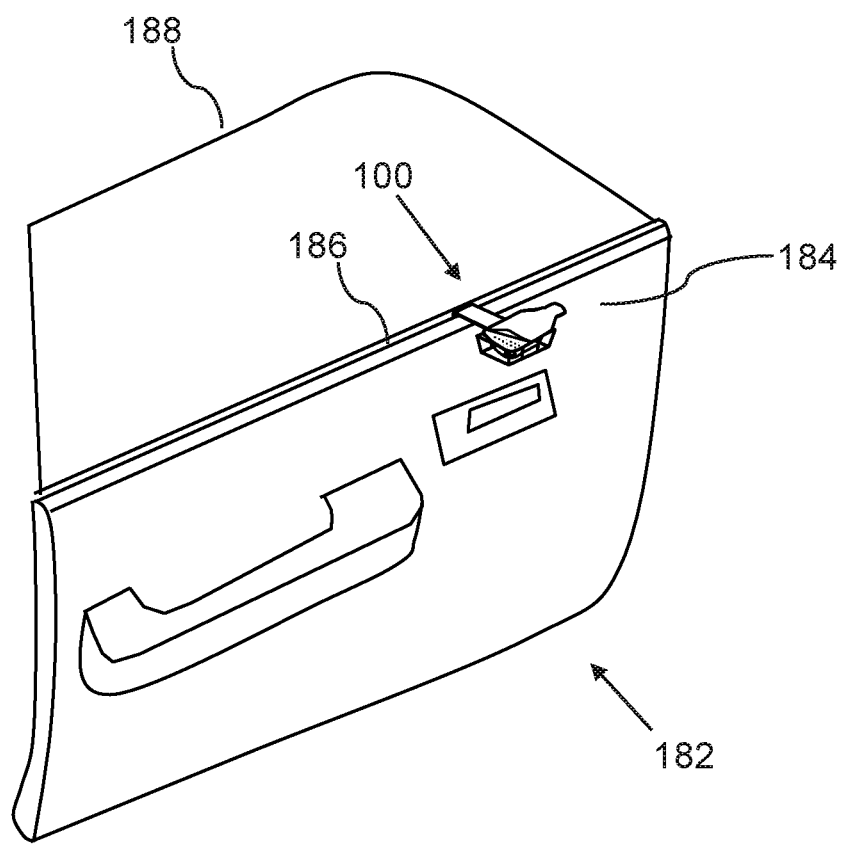
FIG. 1B is a perspective view of a portable condiment holder system, according to an embodiment of the invention.

In an embodiment, as shown FIGS. 1A, 1B, 2A, and 6, a portable condiment holder system 100 for use in a vehicle 180 can include:

a) a portable condiment holder device 110, including:
  a container holder 120, which can be configured as a basket with sides that includes apertures; and
  a holder arm 140, including an outer part 148 and an inner part 142, wherein the outer part is connected to the inner part,
    such that the outer part 148 bends downward relative to the inner part 142;
    such that an inner part 142 of the holder arm 140 is connected to the container holder 120, such that the holder arm 140 extends to an outer side of the container holder 120; and
b) a condiment container 160, including a removable lid 162, such that an interior of the condiment container 160 includes a condiment 168;
such that the container holder 120 can be adapted to match an external shape of the condiment container 160, such that the condiment container 160 is insertable into the container holder;
such that the outer part 148 of the holder arm 140 is insertable in a gap 186 between an inner door casing 184 and a windowpane 188 of a door 182 of a vehicle 180, such as a car 180 (only a minor portion of vehicle 180 is shown in dotted lines in FIG. 1A);
such that the inner part 142 of the holder arm 140 is positioned over the inner door casing 184 and in front of the windowpane 188;
whereby the portable condiment holder device 110 can be attached to an inner side of the door 182, such that the condiment container 160 can be removably positioned in the container holder 120 (with or without the removable lid 162 still attached);
whereby the condiment container 160 is stably and safely positioned with convenient access to the condiment 168 for consumption by a driver or passenger in the vehicle 180. In most configuration of the door 182, the mechanism for holding the portable condiment holder device 110 in position is friction between a seal of windowpane 188 and an inner surface of the inner door casing 184.

In varies related embodiments, the portable condiment holder device 110 is can function as a portable holder for condiment use in vehicles 180, such as automobiles, airplanes, trains, etc., for the purpose of preventing condiment spills in a moving vehicle.

Figure 2A:
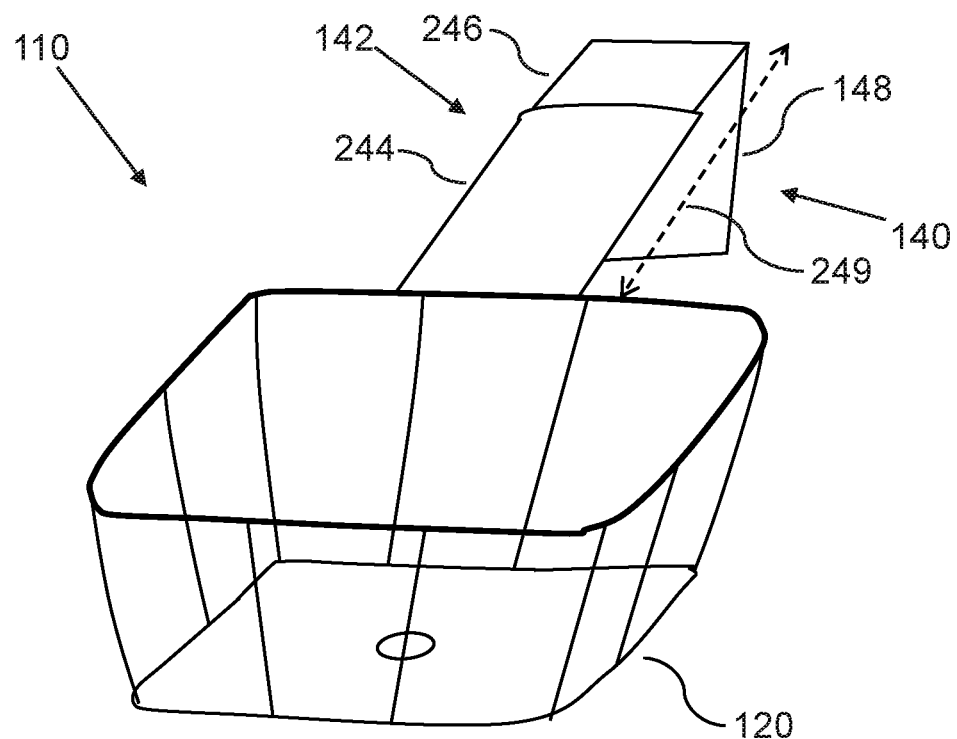
FIG. 2A is a perspective view of a portable condiment holder device, according to an embodiment of the invention.

In a related embodiment, as shown in FIG. 2A, the holder arm 140 can be configured to be length adjustable, such that a length 249 of the inner part 142 can be length adjusted to accommodate varying lengths of the inner door casing 184, for example such that the inner part 142 is configured to be telescoping, such that the inner part 142 includes a first portion 244 and a second portion 246, such that the first portion 244 can slide into the second portion 246. Alternatively, the second portion 246 can slide into the first portion 244.

Figure 2B:
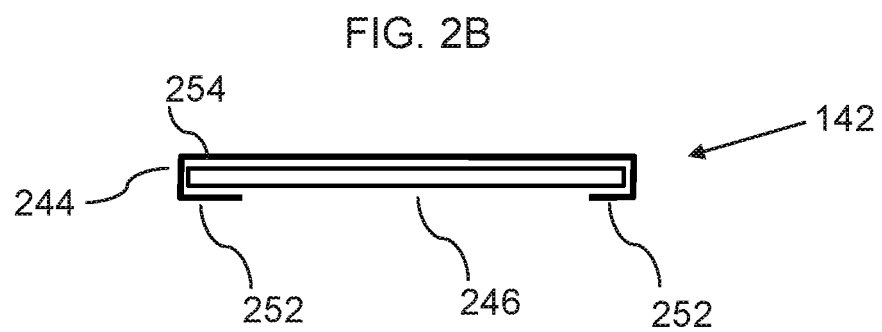
FIG. 2B is a cross-sectional view of a holder arm of a portable condiment holder device, according to an embodiment of the invention.

In a further related embodiment, as shown in FIG. 2B, the first portion 244 can include inward bent edges 252 that form a channel 254, such that the second portion 246 slides into the first portion 244 in the channel 254.

In various further related embodiments, the length adjustable holder arm 140 can facilitate use for a multitude of different applications and installation locations.

Figure 3A:
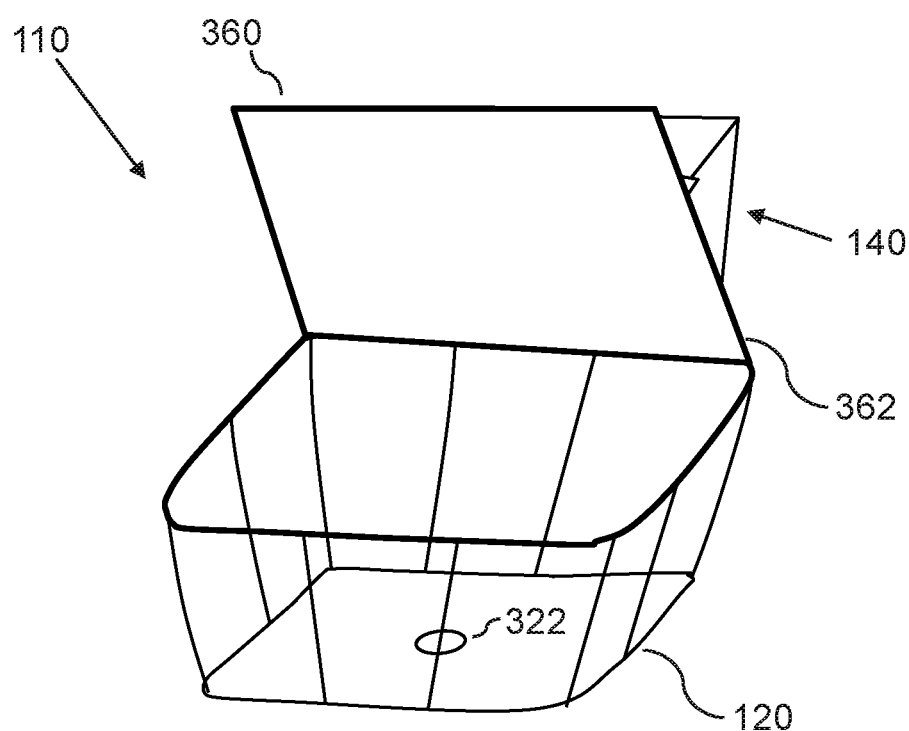
FIG. 3A is a perspective view of a portable condiment holder device with a lid in an open position, according to an embodiment of the invention.
Figure 3B:
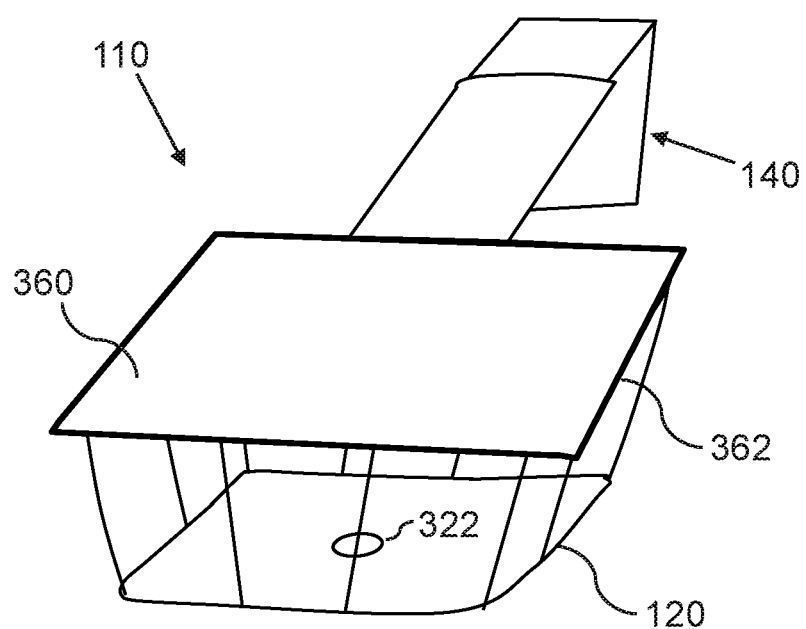
FIG. 3B is a perspective view of a portable condiment holder device with a lid in a closed position, according to an embodiment of the invention.

In a related embodiment, as shown in FIG. 3A, the portable condiment holder device 110 can further include a lid 360, which is hingedly connected to an upper part of the container holder 120, with a hinge 362, such as a living hinge 362, such that the lid 360 is pivotally connected to the upper part of the container holder 120, such that the lid covers an opening to the interior of the container holder 120, when the lid is closed, as shown in FIG. 3B.

Figure 5:
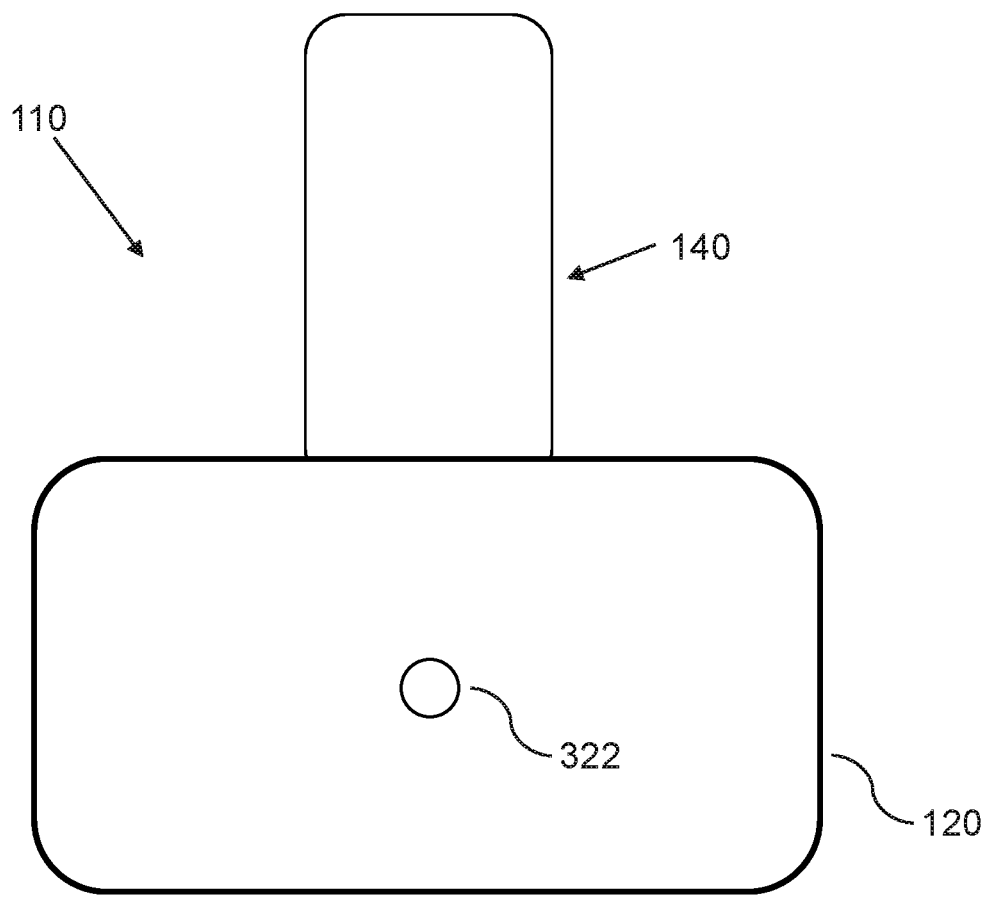
FIG. 5 is a top view of a portable condiment holder device, according to an embodiment of the invention.
Figure 6:
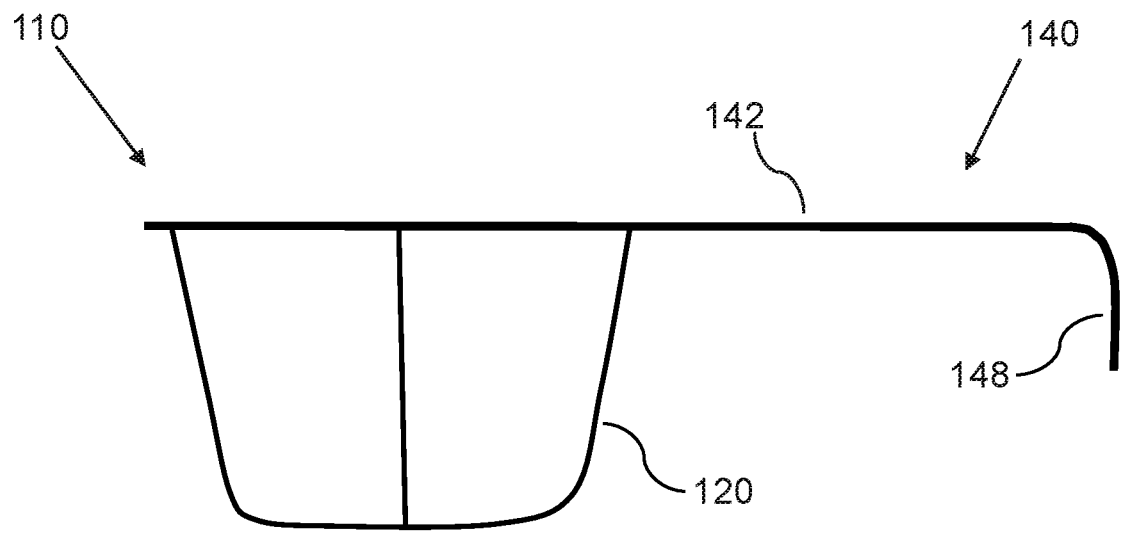
FIG. 6 is a side view of a portable condiment holder device, according to an embodiment of the invention.

In a related embodiment, as shown in FIGS. 3A, 3B, and 5, a bottom of the container holder 120 can further include an aperture 322, which is configured to receive a protrusion on a bottom of the condiment container 160, in order to stabilize the condiment container 160 when positioned in the condiment container 160. Alternatively, the aperture 322 can be used to receive a connector of an accessory, such that the accessory can be connected to the container holder 120, such that the accessory is below the container holder 120.

In a further related embodiment, as shown in FIGS. 3A, 3B, 4A, 4B and 5, a bottom of the container holder 120 can further include a connector aperture 322, which is configured to receive a notched connector 494 of an accessory 490, such that the notched connector 494 is configured to snap in place in the connector aperture 322; whereby the accessory 490 is connectable to the container holder 120, such that the accessory 490 is mountable below the container holder 120.

Figure 4A:
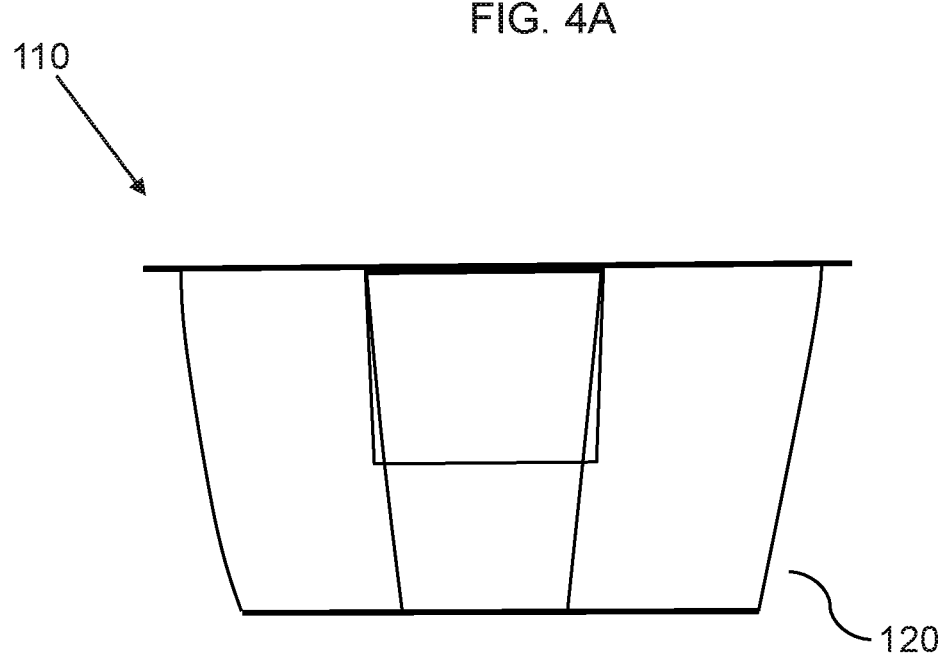
FIG. 4A is a front view of a portable condiment holder device with a separate accessory, according to an embodiment of the invention.
Figure 4A:
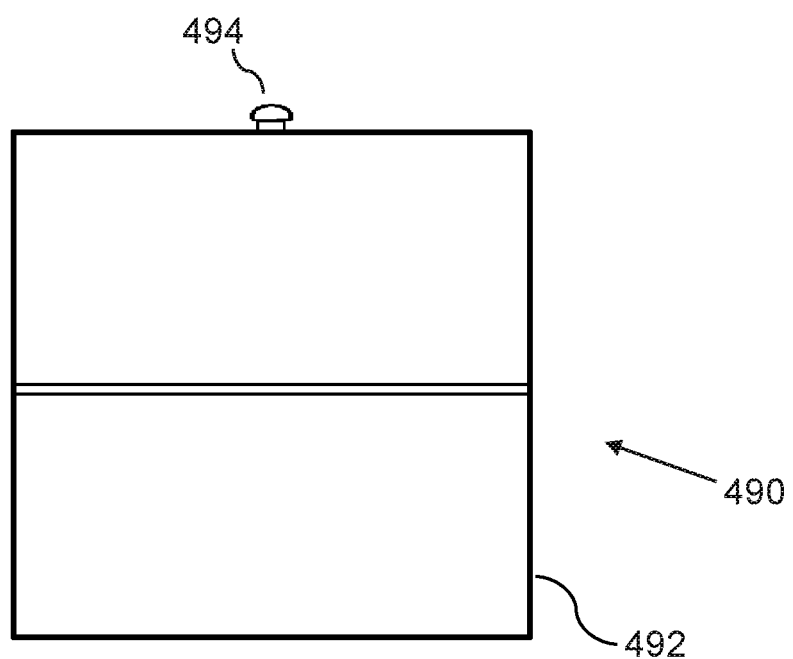

In a yet further related embodiment, as shown in FIGS. 4A and 4B, the portable condiment holder system 100 can further include the accessory 490 comprising an accessory body 492 and the notched connector 494, which is connected to the accessory body 492. As shown, the accessory 490 can for example be a small shelf for storage.

In a further related embodiment, as shown in FIG. 4B, the accessory 490 can be connected to the container holder 120, such that the accessory 490 is mounted below the container holder.

In various related embodiments, the portable condiment holder system 100 and the portable condiment holder device 110 is not limited to a specific size or shape, and can be configured for a multitude of standard condiment shaped packages, including round, oval, square, packaging, and packaging targeted for other food contents, such as French fries, burgers, and/or chicken nuggets, etc.

Here has thus been described a multitude of embodiments of the portable condiment holder system 100 and the portable condiment holder device 110, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A portable condiment holder system, comprising:
 a) a portable condiment holder device, comprising:
  a container holder, which is configured as a basket with sides that includes apertures; and
  a holder arm, comprising an outer part and an inner part,
   wherein the outer part is connected to the inner part, such that the outer part is bent downward relative to the inner part;
   such that the inner part is connected to the container holder, such that the holder arm extends to an outer side of the container holder; and
 b) a condiment container, such that a container interior of the condiment container comprises a condiment;
 such that the container holder is adapted to match an external shape of the condiment container, such that the condiment container is insertable into the container holder;
 such that the outer part of the holder arm is configured to be insertable in a gap between an inner door casing and a windowpane of a door of a vehicle,
 such that the inner part of the holder arm is positioned over the inner door casing and in front of the windowpane;
 whereby the portable condiment holder device is attachable to an inner side of the door, such that the condiment container is removably positionable in the container holder;
 whereby the condiment container is stably and safely positionable with convenient access to the condiment.

2. The portable condiment holder system of claim 1, wherein the inner part is configured to be telescoping, such that the holder arm is configured to be length adjustable, such that a length of the inner part is adjustable to accommodate varying lengths of the inner door casing.

3. The portable condiment holder system of claim 2, wherein the inner part includes a first portion and a second portion, such that the first portion slides into the second portion.

4. The portable condiment holder system of claim 3, wherein the first portion comprises inward bent edges that form a channel, such that the second portion slides into the first portion in the channel.

5. The portable condiment holder system of claim 1, wherein the portable condiment holder device further comprises a lid and a hinge, such that the lid is hingedly connected to an upper part of the container holder,
 such that the lid covers an opening to an interior of the container holder, when the lid is closed.

6. The portable condiment holder system of claim 5, wherein the hinge is a living hinge.

7. The portable condiment holder system of claim 1, wherein a bottom of the container holder further comprises a connector aperture, which is configured to receive a notched connector of an accessory, such that the notched connector is configured to snap in place in the connector aperture;
 whereby the accessory is connectable to the container holder, such that the accessory is mountable below the container holder.

8. The portable condiment holder system of claim 7, further comprising the accessory comprising an accessory body and the notched connector, which is connected to the accessory body.

9. The portable condiment holder system of claim 8, wherein the accessory is connected to the container holder, such that the accessory is mounted below the container holder.

10. A portable condiment holder system, comprising:
 a portable condiment holder device, comprising:
  a container holder; and
  a holder arm, comprising an outer part and an inner part,
   wherein the outer part is connected to the inner part, such that the outer part is bent downward relative to the inner part;
   such that the inner part is connected to the container holder, such that the holder arm extends to an outer side of the container holder; and
 such that the container holder is adapted to match an external shape of a condiment container, whereby the condiment container is insertable into the container holder;
 such that the outer part of the holder arm is configured to be insertable in a gap between an inner door casing and a windowpane of a door of a vehicle,
 such that the inner part of the holder arm is positioned over the inner door casing and in front of the windowpane;
 wherein the inner part is configured to be telescoping, such that the holder arm is configured to be length adjustable, such that a length of the inner part is adjustable to accommodate varying lengths of the inner door casing;
 whereby the portable condiment holder device is attachable to an inner side of the door, whereby the condiment container is removably positionable in the container holder;
 whereby the condiment container is stably and safely positionable with convenient access to a condiment in the condiment container.

11. The portable condiment holder system of claim 10, wherein the inner part includes a first portion and a second portion, such that the first portion slides into the second portion.

12. The portable condiment holder system of claim 11, wherein the first portion comprises inward bent edges that form a channel, such that the second portion slides into the first portion in the channel.

13. The portable condiment holder system of claim 10, wherein the portable condiment holder device further comprises a lid and a hinge, such that the lid is hingedly connected to an upper part of the container holder,
 such that the lid covers an opening to an interior of the container holder, when the lid is closed.

14. The portable condiment holder system of claim 13, wherein the hinge is a living hinge.

15. The portable condiment holder system of claim 10, wherein a bottom of the container holder further comprises a connector aperture, which is configured to receive a notched connector of an accessory, such that the notched connector is configured to snap in place in the connector aperture;
 whereby the accessory is connectable to the container holder, such that the accessory is mountable below the container holder.

16. The portable condiment holder system of claim 15, further comprising the accessory comprising an accessory body and the notched connector, which is connected to the accessory body.

17. The portable condiment holder system of claim 16, wherein the accessory is connected to the container holder, such that the accessory is mounted below the container holder.

18. The portable condiment holder system of claim 10, further comprising the condiment container, such that an interior of the condiment container comprises the condiment.

19. A portable condiment holder system, comprising:
a portable condiment holder device, comprising:
   a container holder; and
   a holder arm, comprising an outer part and an inner part,
      wherein the outer part is connected to the inner part, such that the outer part is bent downward relative to the inner part;
      such that the inner part is connected to the container holder, such that the holder arm extends to an outer side of the container holder; and
such that the container holder is adapted to match an external shape of a condiment container, whereby the condiment container is insertable into the container holder;
such that the outer part of the holder arm is configured to be insertable in a gap between an inner door casing and a windowpane of a door of a vehicle,
such that the inner part of the holder arm is positioned over the inner door casing and in front of the windowpane;
wherein a bottom of the container holder further comprises a connector aperture, which is configured to receive a notched connector of an accessory, such that the notched connector is configured to snap in place in the connector aperture;
whereby the accessory is connectable to the container holder, such that the accessory is mountable below the container holder;
whereby the portable condiment holder device is attachable to an inner side of the door, whereby the condiment container is removably positionable in the container holder;
whereby the condiment container is stably and safely positionable with convenient access to a condiment in the condiment container.

\* \* \* \* \*